(12) United States Patent
Parks (10) Patent No.: US 10,940,447 B2
(45) Date of Patent: Mar. 9, 2021

(54) CONTROL CIRCUIT FOR STOPPING THE FLOW OF FLUID IN A PRIMARY CIRCUIT, AND RELATED METHODS AND DEVICES

(71) Applicant: Pulsair Systems, Inc., Bellevue, WA (US)

(72) Inventor: Richard E. Parks, Bellevue, WA (US)

(*) Notice: Subject to any disclaimer, the term of this patent is extended or adjusted under 35 U.S.C. 154(b) by 99 days.

(21) Appl. No.: 16/024,483

(22) Filed: Jun. 29, 2018

(65) Prior Publication Data

US 2019/0001282 A1  Jan. 3, 2019

Related U.S. Application Data

(60) Provisional application No. 62/527,150, filed on Jun. 30, 2017.

(51) Int. Cl.
| | | |
|---|---|---|
| *B01F 3/02* | (2006.01) | |
| *B01F 13/02* | (2006.01) | |
| *F16K 17/00* | (2006.01) | |

(52) U.S. Cl.
CPC ............ *B01F 3/026* (2013.01); *F16K 17/00* (2013.01); *B01F 13/0277* (2013.01); *F17C 2205/0338* (2013.01)

(58) Field of Classification Search
CPC .......... B01F 3/026; B01F 3/028; B01F 13/02; B01F 13/0277; B01F 13/0255; F17C 2205/0323; F17C 2205/0326; F17C 2205/0332; F17C 2205/0335; F17C 2205/0338; Y10T 137/7761; Y10T 137/7758–777; Y10T 137/87877; G05D 16/2086; G05D 16/2093; G05D 16/2095; G05D 16/2097

USPC ......................................... 366/101, 106, 107
See application file for complete search history.

(56) References Cited

U.S. PATENT DOCUMENTS

| | | | | |
|---|---|---|---|---|
| 3,582,046 A * | 6/1971 | Mueller | ............ | B01F 13/0255 366/106 |
| 4,136,970 A * | 1/1979 | Cabrera | ............ | B01F 13/0277 366/101 |
| 4,431,020 A * | 2/1984 | Kowalski | ............... | F16K 1/123 137/110 |
| 4,595,296 A * | 6/1986 | Parks | ................. | B01F 13/0255 366/106 |
| 4,702,273 A * | 10/1987 | Allen, Jr. | ................ | F02C 7/277 123/179.31 |
| 4,951,705 A * | 8/1990 | Carey | ................ | G05D 16/0663 137/487.5 |
| 4,961,441 A * | 10/1990 | Salter | ................ | G05D 16/2053 137/14 |

(Continued)

*Primary Examiner* — David Colon-Morales
(74) *Attorney, Agent, or Firm* — Janeway Patent Law PLLC; John M. Janeway (57) ABSTRACT

A control circuit for automatically stopping the flow of a gas in a primary circuit, includes a valve, a sensor and a controller. The valve is couplable with a primary pressure-regulator that controls the flow of another gas in a primary circuit. The valve has an inlet operable to receive a gas and an outlet operable to distribute the gas. The sensor is positionable in the primary circuit and operable to sense a parameter of the flow of the gas in the primary circuit and generate a signal that represents the sensed parameter. The controller is operable to receive the sensor's signal and, in response to the signal, direct the valve to close if the parameter of the flow of gas in the primary circuit lies outside of a predetermined range.

28 Claims, 3 Drawing Sheets

(56) References Cited

U.S. PATENT DOCUMENTS

| | | | | |
|---|---|---|---|---|
| 5,047,965 A * | 9/1991 | Zlokovitz | G05D 16/16 |
| | | | 700/282 |
| 5,678,601 A * | 10/1997 | Engel | G05D 16/2095 |
| | | | 137/486 |
| 6,003,543 A * | 12/1999 | Sulatisky | G05D 16/2013 |
| | | | 137/487.5 |
| 6,056,008 A * | 5/2000 | Adams | G05D 16/2095 |
| | | | 137/487.5 |
| 6,112,137 A * | 8/2000 | McCarty | F17D 1/04 |
| | | | 700/301 |
| 6,584,999 B2 * | 7/2003 | Inayama | G05D 16/2024 |
| | | | 137/487.5 |
| 6,629,773 B2 * | 10/2003 | Parks | B01F 13/0255 |
| | | | 366/107 |
| 6,953,045 B2 * | 10/2005 | Enerson | F17C 5/06 |
| | | | 137/14 |
| 6,986,361 B2 * | 1/2006 | Mendoza | G05D 16/2013 |
| | | | 137/487.5 |
| 7,267,475 B2 * | 9/2007 | Steele | B01F 3/18 |
| | | | 366/101 |
| 7,314,059 B2 * | 1/2008 | Schuetze | G05D 27/02 |
| | | | 137/102 |
| 7,621,293 B2 * | 11/2009 | Snowbarger | F16K 37/0091 |
| | | | 137/487.5 |
| 8,147,117 B2 * | 4/2012 | Drewry | B01F 13/0222 |
| | | | 366/101 |
| 8,579,252 B2 * | 11/2013 | Heer | F15B 20/002 |
| | | | 137/487.5 |
| 9,381,614 B2 * | 7/2016 | Takahashi | B24B 7/228 |
| 9,465,391 B2 * | 10/2016 | Grumstrup | G05D 16/2066 |
| 2006/0110491 A1 * | 5/2006 | Parks | B01F 13/0255 |
| | | | 426/11 |
| 2009/0248210 A1 * | 10/2009 | Arenas | G05D 16/2095 |
| | | | 700/282 |

* cited by examiner

FIG. 5

CONTROL CIRCUIT FOR STOPPING THE FLOW OF FLUID IN A PRIMARY CIRCUIT, AND RELATED METHODS AND DEVICES

BACKGROUND

Systems for mixing liquids and other materials held in tanks often include injecting air into the liquid or other materials to urge the liquid or other material to move and thus mix. If a liquid is to be mixed, the air may be injected at the bottom of the tank to form a bubble in the liquid. Once formed the bubble ascends to the top of the liquid. As the bubble ascends, the bubble moves the liquid in its path and generates a flow or current of the liquid inside the tank. This flow or current of the liquid, in turn, mixes the liquid. If material held in the tank is not a liquid such as seeds or fine particulates, then the injected air ascends to the top of the material but does not typically form a bubble as it would in a liquid but rather a zone of gas under pressure that expands and escapes up through the material and as it escapes it mixes the material.

In such mixing systems, the bubble or pressure zone of air is generated by quickly injecting a desired amount of air into the liquid or other material. To do this, the mixing system typically includes an injector coupled to a source of gas under pressure. A controller then directs the injector at a specific time to open to allow the gas to enter the liquid or other material, and remain open for a specific period. When the period ends the controller directs the injector to close. To control and modify the flow of gas through the injector, such mixing systems often include a pressure regulator.

Unfortunately, if the injector gets stuck in the open position gas will continue to flow through the injector for much longer than the specific period. This can cause the source of the gas to quickly be depleted, and/or waste much energy by having to keep the gas pressurized for longer than the specific period. This can also adversely affect the liquid or material being mixed by subjecting the liquid or other material to excessive mixing.

Thus, there is a need for a control circuit that can effectively determine when such an adverse problem exists in a mixing system and stop the flow of gas through the mixing system.

SUMMARY

In one aspect of the invention, a control circuit for automatically stopping the flow of a gas in a primary circuit, includes a valve, a sensor and a controller. The valve is couplable with a primary pressure-regulator that controls the flow of another gas in a primary circuit. The valve has an inlet operable to receive a gas and an outlet operable to distribute the gas. When the valve is open the pressure of the gas at the valve's outlet equalizes with the pressure of the gas at the valve's inlet. When the valve is closed the pressure of the gas at the valve's outlet is prevented from equalizing with the pressure of the gas at the valve's inlet. The sensor is positionable in the primary circuit and operable to sense a parameter of the flow of the gas in the primary circuit and generate a signal that represents the sensed parameter. The controller is operable to receive the sensor's signal and, in response to the signal, direct the valve to close if the parameter of the flow of gas in the primary circuit lies outside of a predetermined range, to change the pressure of the gas at the valve's outlet.

With the control circuit one can block the flow of gas/air toward an injector if the injector becomes stuck in the open position. If the injector becomes stuck in the open position, the primary circuit could consume much more gas/air than required, which could cause the system to consume excess energy and excessively mix the contents.

In another aspect of the invention, a method for automatically stopping the flow of a gas in a primary circuit includes sensing a parameter of a flow of gas in a primary circuit and generating a signal that represents the sensed parameter, receiving the sensor's signal, and comparing the parameter represented by the received signal to a predetermined range. Then, in response to the parameter lying outside of the predetermined range, closing a valve of a control circuit, the valve having an inlet and an outlet wherein when the valve is open the pressure of the gas at the valve's outlet equalizes with the pressure of the gas at the valve's inlet, and when the valve is closed the pressure of the gas at the valve's outlet is prevented from equalizing with the pressure of the gas at the valve's inlet. The method also includes changing the pressure of the gas at a control input of a primary pressure-regulator of the primary circuit by changing the pressure of the gas in the valve's outlet.

DETAILED DESCRIPTION

Figure 1:
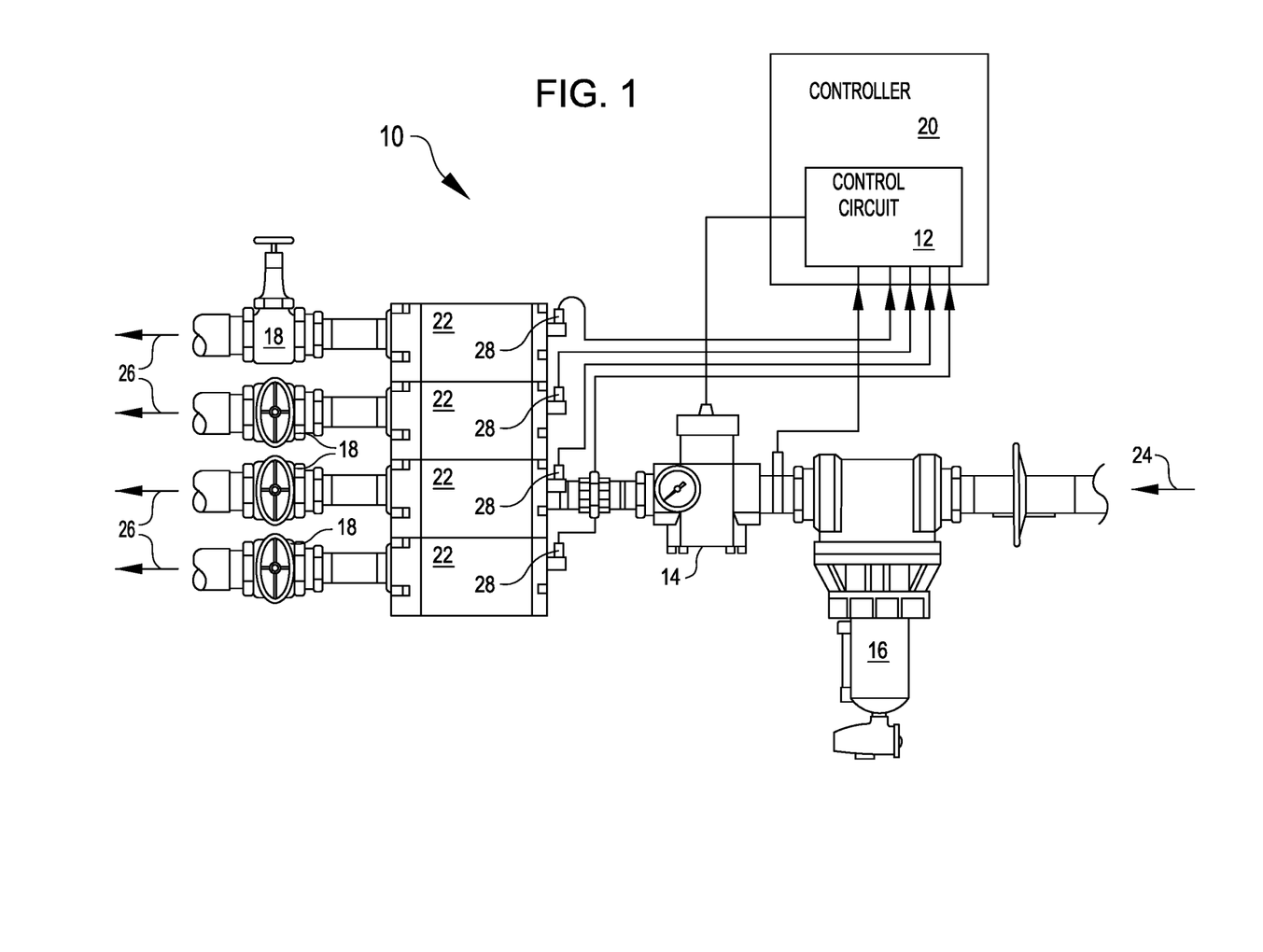
FIG. 1 shows a schematic view of a portion of a primary circuit that includes a control circuit, according to an embodiment of the invention.

FIG. 1 shows a schematic view of a portion of a primary circuit 10 that includes a control circuit 12, according to an embodiment of the invention. The primary circuit 10 may be any circuit that provides fluid (either liquid or gas) to a specific location. Here the primary circuit 10 provides a gas (not shown) to a valve (also not shown) that is located in a tank (not shown) that holds ingredients fermenting to make wine. The gas is used in the vinification process to stir the ingredients and break the cap, if present, by forming a bubble that rises up through the fermenting ingredients. Other uses of the primary circuit 10 may include providing air to a tank that stores oil to mix the oil in a manner similar to gas used in the vinification process, or the primary circuit 10 may provide water to sprinklers positioned in a yard.

The control circuit 12 is coupled to the primary circuit 10 and monitors a parameter of the flow of the gas in the primary circuit 10. If the parameter lies outside of a predetermined range then the control circuit 12 directs a component of the primary circuit 10 to stop the flow of gas. For example, in this and other embodiments, the control circuit 12 is coupled to a pressure regulator 14 of the primary circuit 10 and monitors the static pressure of the gas flowing in the primary circuit 10. If the static pressure drops below a predetermined threshold pressure or remains low for a period whose duration is greater than a predetermined period, then the control circuit 12 directs the pressure regulator 14 to stop the flow of gas.

Monitoring the static pressure of the flow and reacting based on one or both of the pressure and duration flow parameters, allows the control circuit 12 to identify when a valve in the primary circuit 10 is stuck open, when the source of gas for the primary circuit 10 no longer provides gas at the designed pressure, or when the primary circuit 10 has a leak. This is important when the primary circuit 10 is used during a vinification process to generate a bubble in fermenting ingredients because to generate such a bubble, pressurized gas (typically air) is injected into the tank for a quick period and then stopped. If the primary circuit 10 has a valve stuck open or a damaged source of pressurized gas, then the ingredients in the tank could be excessively mixed, which can damage the fermenting process. If the primary circuit 10 has a leak, then the primary circuit 10 would waste energy consuming pressurized gas without generating any bubbles in the vinification tank.

During the quick period that the gas flows in the primary circuit 10, the static pressure of the flow drops and remains low, and when the gas stops flowing at the end of the quick period the static pressure rises and remains high. Typically for fermenting grapes, the total pressure of the gas inside the primary circuit 10 to be conveyed to a valve inside the tank is 106 psi, and the period during which the valve is opened to release the gas into the tank is one second. After the valve closes the injected gas combines to form a bubble that then rises up through the fermenting grape juice to mix the juice. When the static pressure of the gas flowing in the primary circuit 10 drops below a predetermined threshold, a valve of the primary circuit 10 might be stuck open, a significant leak in the primary circuit 10 might exist, or the source of pressurized gas for the primary circuit 10 might be damaged. When the static pressure of the gas flowing in the primary circuit 10 rises above a predetermined ceiling, the source of pressurized gas for the primary circuit might be damaged. And when the static pressure of the gas flowing in the primary circuit 10 remains between the predetermined threshold and the predetermined ceiling for a period greater than a predetermined period, a valve of the primary circuit 10 might be stuck open or a slow leak in the primary circuit 10 might exist.

Still referring to FIG. 1, in this and other embodiments the primary circuit 10 includes a filter 16, an isolation valve 18, a controller 20, an injector 22, and the pressure regulator 14. When the primary circuit 10 distributes gas to a valve (not shown) that is located elsewhere, the gas enters the portion of the primary circuit 10 that is shown in FIG. 1 from the right as indicated by the arrow 24 and exits the portion of the primary circuit 10 from the left as indicated by the arrows 26. As shown here, the primary circuit 10 distributes the gas to four different valves located elsewhere. In other embodiments, the primary circuit 10 may distribute gas to less than four valves or more than four valves depending on the specific application for the primary circuit 10.

The filter 16 may be any desired filter that filters or prevents moisture and/or particulates suspended in the gas from proceeding further into the primary circuit 10 to protect the downstream components of the primary circuit 10. The specific filter 16 included in the primary circuit 10 depends on the specific application for the primary circuit 10 and the quality of the gas flowing in the circuit 10. The isolation valve 18 may be any desired valve capable of stopping the flow of gas in the primary circuit 10 when one needs to check or repair one or more of the valves located elsewhere or any other component of the circuit 10 that lies downstream from the isolation valves 18. The controller 20 directs the operation of each of the injectors 22 based on input provided by a person and may include any desired computer circuitry for accomplishing this. As previously discussed, the primary inputs in this and other embodiments of the circuit 10 include when to open each injector 22 to allow gas to flow toward the valve coupled to the respective injector 22, and when to close each injector 22. The injectors 22 allow the control of the gas in the primary circuit 10 to occur near the controller, away from the valves that are located elsewhere, such as in a vinification tank or oil storage tank. This allows one to locate the controller and the injectors in a safer and more maintenance-friendly environment than the location of the vinification tank or oil storage tank. In some embodiments, each injector 22 is opened and then closed while the other remaining injectors 22 are closed, but in some embodiments one or more of the injectors 22 may be open while one or more other injectors 22 are open. Each of the injectors 22 may be any desired injector 22 capable of opening and closing when directed by the controller 20. The pressure regulator 14 may be any desired pressure regulator capable of stopping the flow of gas through it when directed by the control circuit 12.

Figure 2:
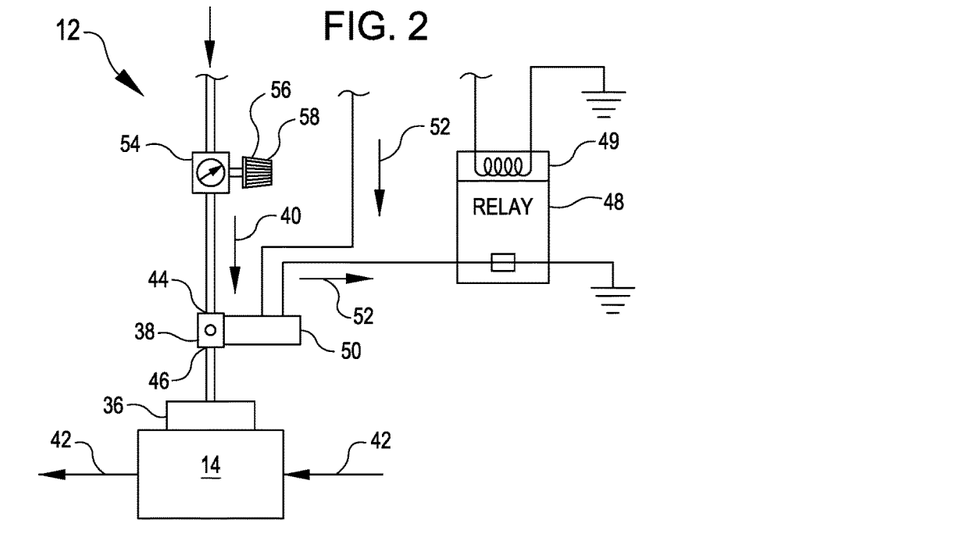
FIG. 2 shows a schematic view of the control circuit shown in FIG. 1, according to an embodiment of the invention.

In this and other embodiments, the control circuit 12 includes a valve, a sensor 28, and a controller. The valve is not shown in FIG. 1 but is shown in FIGS. 2 and 4 and discussed in greater detail in conjunction with FIGS. 2-5. The sensor 28 senses a parameter of the flow of the gas (here static pressure) in the primary circuit 10 and generates a signal that represents the sensed parameter. The generated signal is then received by the controller (here the primary circuit's controller 20) and used to determine how to direct the control circuit's valve as discussed in greater detail in conjunction with FIGS. 3 and 5. Here, the control circuit 12 includes a sensor 28 for each injector 22. This allows the controller to identify more accurately where a problem with the flow of gas in the primary circuit 10 exists, if a problem exists. In other embodiments, the sensor 28 may sense the dynamic pressure of the gas, and a single sensor 28 may be located just downstream from the pressure regulator 14 or just upstream from the pressure regulator 14. In other embodiments, the control circuit's controller may be separate and independent of the primary circuit's controller 20.

FIG. 2 shows a schematic view of the control circuit 12 shown in FIG. 1, according to an embodiment of the invention. The control circuit 12 functions by controlling the flow of a gas (hereafter pilot gas to avoid confusion with the gas that flows through the primary circuit 10) to the control input 36 of the primary circuit's pressure regulator 14 (FIG. 1). In this and other embodiments, the control circuit 12 is configured to allow the flow of the pilot gas to the control input of the pressure regulator 14 when the control circuit 12 is powered, and to block the flow of the pilot gas to the control input of the regulator 14 when the control circuit 12 is not powered. This allows the control circuit 12 to stop the flow of gas in the primary circuit 10 should the primary and control circuits 10 and 12, respectively, experience a power outage.

In this and other embodiments, the control circuit 12 includes a valve 38 that, when open allows the flow of the pilot gas to the control input 36 of the regulator 14 and when closed blocks the flow of the pilot gas to the control input 36. In operation, the pilot gas flows in the direction indicated by the arrow 40, and the gas in the primary circuit 10 flows through the primary circuit's pressure regulator 14 in the direction indicated by the arrows 42. The valve 38 includes an inlet 44 and an outlet 46. When the valve 38 is open, the pressure of the pilot gas in the valve's outlet 46 is allowed to equalize with the pressure of the pilot gas in the valve's inlet 44, and it is the pressure that the pilot gas exerts on the control input 36 of the pressure regulator 14 that dictates whether the pressure regulator 14 stops the flow of gas in the primary circuit 10. More specifically, in this and other embodiments, the pressure regulator 14 remains open while the pilot gas in the control input 36 of the pressure regulator 14 exerts the same pressure as that found in the pilot gas in the valve's inlet 44. While open, when gas flows through the pressure regulator 14, the gas has a pressure and flow rate designed for the application (here vinification). When the valve 38 of the control circuit 12 is closed, the pilot gas in the valve's outlet is vented to the surrounding environment which cause the pressure at the control input 36 of the pressure regulator 14 to decrease. And, because the valve 38 is closed, the pressure at the control input 36 remains low. This causes the pressure regulator 14 to close and stop the flow of gas in the primary circuit 10.

Still referring to FIG. 2, in this and other embodiments the control circuit 12 includes a relay 48, and the valve 38 includes a solenoid 50. The solenoid 50 controls the opening and closing of the valve 38 and is configured to open the valve 38 when energized—that is, electric current flows through the solenoid 50 in the direction indicated by the arrows 52—and to close the valve 38 when not energized—that is, electric current does not flow through the solenoid 50. The relay 48 controls the flow of electric current through the valve's solenoid 50 and is configured to stop the flow of electric current through the solenoid 50 when the electric current flows through the relay 48, and to allow the flow of electric current through the solenoid 50 when electric current does not flow through the relay 48. To do this the relay 48 incudes a solenoid 49 that when energized—that is, electric current flows through the solenoid 49—stops the flow of electric current through the valve's solenoid 50, and when not energized allows electric current to flow through the valve's solenoid 50. The controller 20 (FIG. 1) dictates whether electric current flows through the relay solenoid 49 according to a protocol that is described in greater detail in conjunction with FIG. 3. As previously mentioned, because the valve 38 is configured to be closed when electric current does not flow through the valve's solenoid 50, the control circuit 12 directs the pressure regulator 14 to stop the flow of the gas in the primary circuit 10 when the control circuit 12 experiences a power outage. This allows the control circuit 12 to provide a fail-safe mechanism to the primary circuit 10 which may be desired in some applications, such as stirring the ingredients and breaking the cap during a vinification process.

The control circuit 12 may include any desired fluid as the working fluid in the circuit 12. For example, in this and other embodiments, the working fluid is some of the gas flowing in the primary circuit 10 that has been diverted into the control circuit 12. To allow the control circuit 12 to provide a pilot gas pressure at the control input 36 of the primary circuit's pressure regulator 14 that is different than the pressure of the gas flowing in the primary circuit 10, the control circuit 12 includes a pressure regulator 54. The pressure regulator 54 may be any desired regulator and may include a control input 56 itself. In this and other embodiments, the control input 56 is a manual input in which one rotates the knob 58 to set the pressure of the pilot gas that flows through the regulator 54 toward the valve's inlet 44.

Figure 3:
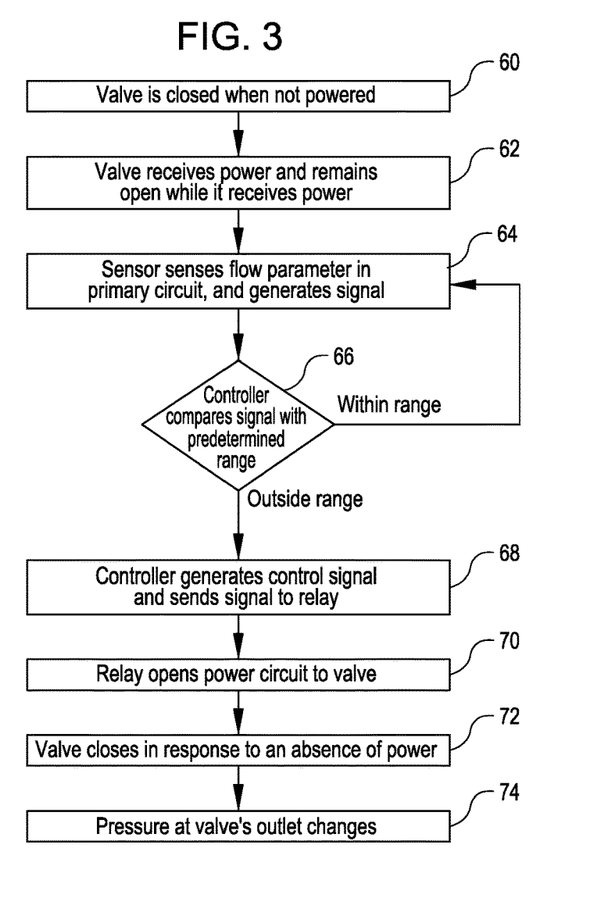
FIG. 3 shows a flowchart of the control circuit shown in FIG. 2 in operation, according to an embodiment of the invention.
Figure 4:
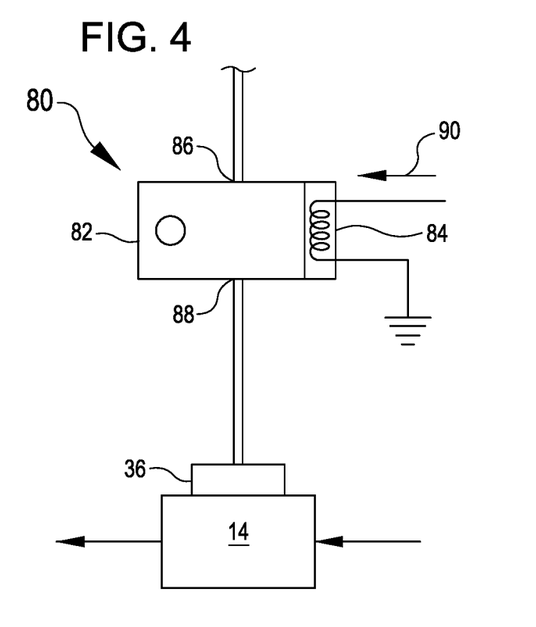
FIG. 4 shows a schematic view of the control circuit shown in FIG. 1, according to another embodiment of the invention.

FIG. 3 shows a flowchart of the operation of the control circuit 12 shown in FIG. 2, according to an embodiment of the invention. As previously mentioned, the specific protocol that the control circuit 12 uses to determine whether to stop the flow of gas through the primary circuit 10 depends on the purpose or application of the flow of gas through the primary circuit 10. And the parameters of the flow of gas through the primary circuit 10 that the control circuit 12 monitors and then, in response, directs one or more components of the control circuit 12 to act, also depends in large part on the purpose or application of the primary circuit's 14 function.

For example, in this and other embodiments, during a vinification process the parameters of the flow of gas through the primary circuit 10 that the control circuit's controller monitors and then, in response, acts are the static pressure and the duration of some changes in the static pressure. More specifically, when gas is not flowing through the primary circuit 10 the pressure of the gas in the circuit 10 is 106 psi (pounds per square inch). When one of the four injectors 22 (FIG. 1) is open, gas flows in the primary circuit 10 and the static pressure of the flowing gas drops. If another injector 22 is also open while the first injector 22 is open then the static pressure of the gas drops further, and so on if more injectors are open at the same time. To account for this, the controller 20 (FIG. 1) monitors this condition and if present compares the sensed static pressure to the appropriate predetermined threshold (here 101.2 psi) and ceiling (106 psi). If the sensed static pressure lies within the appropriate predetermined range (between the threshold and ceiling pressures), then the controller 20 allows the valve's solenoid 50 (FIG. 2) to remain energized. If, however, the sensed static pressure is below the appropriate predetermined threshold or above the appropriate predetermined ceiling, then the controller records the event as an error, generates a signal, and then sends the signal to the relay 48 (FIG. 2). The relay 48 receives the signal and in response de-energizes the valve's solenoid 50. The valve 38 than closes and exposes the valve's outlet 46 (FIG. 2) to the ambient environment so that the pilot gas in the control inlet 36 (FIG. 2) can escape.

Similarly, in this and other embodiments, the controller 20 also monitors the duration of the period that one or more of the injectors 22 are to remain open and compares the duration of the sensed static pressure with the duration that the injectors 22 are to remain open. If the sensed static pressure lies within the appropriate range for that moment, then the controller 20 allows the valve's solenoid 50 to remain energized. If, however, the static pressure remains lower than the appropriate predetermined threshold, then the controller records the event as an error, generates a signal, and then sends the signal to the relay 48. The relay 48 receives the signal and in response de-energizes the valve's solenoid 50. The valve 38 than closes and exposes the valve's outlet 46 to the ambient environment so that the pilot gas in the control inlet 36 can escape.

Still referring to FIG. 3, in this and other embodiments, the operation of the control circuit 12 begins with the valve 38 receiving electric power to keep the valve 38 open. This is shown in blocks 60 and 62 of the flow chart. Next, at block 64, the sensor 28 (FIG. 1) senses the static pressure in the flow of gas through primary circuit 10 and generates a signal that represents the amount of pressure sensed. Then at block 66, the controller 22 receives the signal generated by the sensor and compares the sensed pressure to an appropriate predetermined range. If the sensed pressure lies within the range, then the controller does not send a signal to the relay 48 to close the valve 38 and continues to monitor the sensed pressure from the sensor 28. If the sensed pressure does not lie within the range, then at block 68 the controller 22 generates a signal that causes the relay solenoid 49 to open the power circuit to the valve 38 at block 70. This, in turn, de-energizes the valve's solenoid 50, at block 72 causing the valve 38 to close. This also causes, at block 74, the pilot gas in the valve's outlet 46, and thus the pilot gas at the control input of the primary circuit's pressure regulator 14 to vent to the atmosphere.

FIG. 4 shows a schematic view of a control circuit 80 shown in FIG. 1, according to another embodiment of the invention. Similar to the control circuit 12 discussed in conjunction with FIG. 2, The control circuit 80 functions by controlling the flow of a pilot gas to the control input of the primary circuit's pressure regulator 14 (FIG. 1). But, unlike the control circuit 12, in this and other embodiments, the control circuit 80 is configured to block the flow of the pilot gas to the control input of the pressure regulator 14 when the control circuit 80 is powered, and to allow the flow of the pilot gas to the control input of the regulator 14 when the control circuit 80 is not powered. This may be desirable when the primary circuit 10 does not need a fail-safe mechanism because the control circuit 80 only consumes electric power when the control circuit 80 directs the pressure regulator 14 to stop the flow of gas in the primary circuit 10.

In this and other embodiments, the control circuit 80 includes a valve 82, and a solenoid 84 to open and close the valve 82. The valve 82 includes an inlet 86 and an outlet 88. When the valve 82 is open the pressure of the pilot gas at the valve's outlet 88 equalizes with the pressure of the pilot gas at the valve's inlet 86, and when the valve 82 is closed the pressure of the gas at the valve's outlet 88 is prevented from equalizing with the pressure of the gas at the valve's inlet 86. After the valve's outlet 88 is isolated from the valve's inlet 86, the pressure of the pilot gas at the control input 36 of the pressure regulator changes. The change may be an increase in the pressure, or a decrease in the pressure similar to the control circuit 12 (FIGS. 1-3). If the change in pressure is to be an increase, then when the valve 82 closes, the valve's outlet 88 may be exposed or coupled to a source of gas having a pressure greater than the pressure of the pilot gas at the valve's inlet 86. If the change in pressure is to be a decrease, then when the valve 82 closes, the valve's outlet 88 may be exposed or coupled to a source of gas having a lower pressure than the pressure of the pilot gas at the valves inlet 86. For example, the valve's outlet may be coupled with a large cavity into which the pilot gas in the valve's outlet 88 may vent, similar to the control circuit 12 venting to the ambient environment.

The solenoid 84 controls the opening and closing of the valve 82 and is configured to close the valve 82 when energized—that is, electric current flows through the solenoid 84 in the direction indicated by the arrow 90—and to open the valve 82 when not energized—that is, electric current does not flow through the solenoid 84. By opening the vale 82 when not energized, the solenoid 84 only consumes electric power when the controller (not shown) of the control circuit 80 determines that the pressure regulator 14 should stop the flow of gas through the primary circuit 10 and directs the valve 82 to close.

Figure 5:
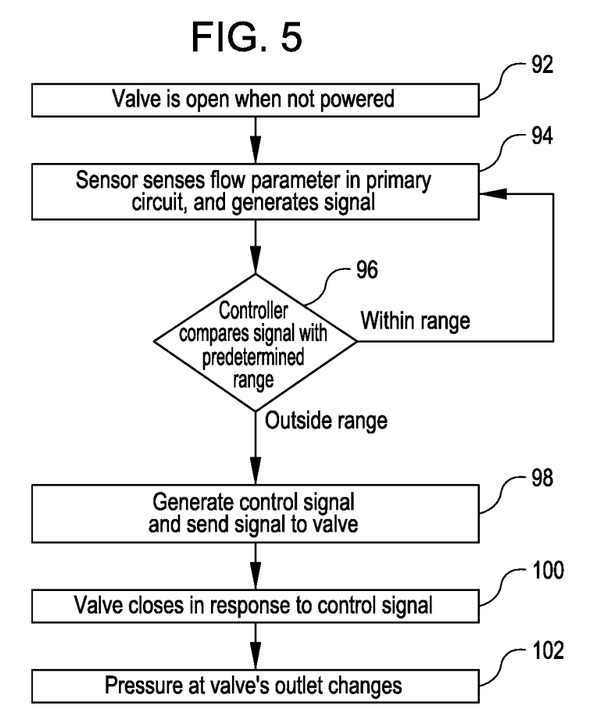
FIG. 5 shows a flowchart of the control circuit shown in FIG. 4, according to an embodiment of the invention.

FIG. 5 shows a flowchart of the operation of the control circuit 80 shown in FIG. 4, according to an embodiment of the invention. Similar to the control circuit 12 (FIGS. 1-3), the parameters of the flow of gas through the primary circuit 10 that the control circuit 80 monitors and then, in response, directs one or more components of the control circuit 80 to act, are the static pressure of the flow and the duration of some of the changes in the static pressure. However, depending on the purpose or application of the primary circuit 10 and the circuit's function, there may be other protocols and parameters of the flow through the primary circuit 10 that the control circuit 80 uses and monitors, respectively.

In this and other embodiments, the operation of the control circuit 80 begins with the valve 82 being open without having to receive electric power to keep the valve 82 open. This is shown in block 92 of the flow chart. Next, at block 94, the sensor 28 (FIG. 1) senses the static pressure in the flow of gas through the primary circuit 10 and generates a signal that represents the amount of pressure sensed. Then at block 96, the controller 22 receives the signal generated by the sensor 28 and compares the sensed pressure to an appropriate predetermined range. If the sensed pressure lies within the range, then the controller 22 does not send a signal to the solenoid 84 to close the valve 82 and continues to monitor the sensed pressure from the sensor 28. If the sensed pressure does not lie within the range, then at block 98 the controller 22 generates a signal that causes the solenoid 84 to close the valve 82 at block 100. This, in turn, causes, at block 102, the pilot gas in the valve's outlet 88, and thus the pilot gas at the control input 36 of the primary circuit's pressure regulator 14 to vent to the atmosphere. When the pressure drops in pilot gas pressure at the control input 36, the pressure regulator 14 closes to stop the flow of gas through the primary circuit 10.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A control circuit for automatically stopping the flow of a gas in a primary circuit, the control circuit comprising:
    a valve having an inlet operable to receive a pilot gas, and an outlet operable to distribute the pilot gas and couplable with a primary pressure-regulator that controls the flow of another gas in the primary circuit, wherein:
        when the valve is open the pressure of the pilot gas at the valve's outlet equalizes with the pressure of the pilot gas at the valve's inlet, and
        when the valve is closed the pressure of the pilot gas at the valve's outlet is prevented from equalizing with the pressure of the pilot gas at the valve's inlet;
    a sensor positionable in the primary circuit and operable to sense a parameter of the flow of the gas in the primary circuit and generate a signal that represents the sensed parameter; and
    a controller operable to receive the sensor's signal and, in response to the signal, direct the valve to close if the parameter of the flow of gas in the primary circuit lies outside of a predetermined range, to change the pressure of the pilot gas at the valve's outlet and cause the primary pressure-regulator that controls the flow of gas in the primary circuit to close and stop the flow of gas in the primary circuit.

2. The control circuit of claim 1 wherein the pilot gas in the control circuit is a portion of the gas in the primary circuit that is diverted into the control circuit.

3. The control circuit of claim 1 wherein when the valve is closed the pressure of the pilot gas in the valve's outlet equalizes with the pressure of the ambient environment.

4. The control circuit of claim 1 wherein the valve includes a solenoid that when energized closes the valve and when not energized opens the valve.

5. The control circuit of claim 1 wherein the sensor senses the static pressure of the gas flowing in the primary circuit.

6. The control circuit of claim 1 wherein the controller directs the valve to close if the static pressure of the gas flowing in the primary circuit remains below a threshold for a period exceeding a predetermined period.

7. The control circuit of claim 1 further comprising a relay operable to open and close the valve.

8. The control circuit of claim 7 wherein the valve includes a solenoid that when energized opens the valve and when not energized closes the valve.

9. The control circuit of claim 8 wherein the relay includes a solenoid that when energized causes the valve's solenoid to de-energize.

10. The control circuit of claim 8 wherein in response to the signal received, the controller directs the valve to close by causing the relay to de-energize the valve's solenoid if the parameter of the flow of gas in the primary circuit lies outside of a predetermined range.

11. The control circuit of claim 1 further comprising a pressure-regulator having an inlet operable to receive the pilot gas and an outlet coupled with the valve's inlet, the control circuit's pressure-regulator being operable to adjust and control the pressure of the pilot gas in the valve's inlet.

12. A pneumatic circuit comprising:
an injector operable to control the distribution of a gas in a primary circuit;
a primary pressure-regulator operable to adjust and control the pressure of the gas that the injector distributes;
a control circuit operable to automatically stop the flow of the gas through the pressure-regulator, the control circuit comprising:
a valve having an inlet operable to receive a pilot gas and an outlet operable to distribute the pilot gas and coupled with the primary pressure-regulator wherein:
when the valve is open the pressure of the pilot gas at the valve's outlet equalizes with the pressure of the pilot gas at the valve's inlet, and
when the valve is closed the pressure of the pilot gas at the valve's outlet is prevented from equalizing with the pressure of the pilot gas at the valve's inlet;
a sensor positioned between the primary pressure-regulator and the injector and operable to sense a parameter of the flow of gas toward the injector and generate a signal that represents the sensed parameter; and
a controller operable to receive the sensor's signal and, in response to the signal, direct the valve to close if the parameter of the flow of the gas through the primary pressure-regulator lies outside of a predetermined range, to change the pressure of the pilot gas at the valve's outlet and cause the primary pressure-regulator to close and stop the flow of the gas toward the injector.

13. The pneumatic circuit of claim 12 wherein the pilot gas is air and includes a total pressure greater than the air pressure in the ambient environment.

14. The pneumatic circuit of claim 12 wherein the pilot gas in the control circuit is a diverted portion of the gas that flows through the primary pressure-regulator.

15. The pneumatic circuit of claim 12 further comprising a relay operable to open and close the valve.

16. The pneumatic circuit of claim 15 wherein the control circuit's valve includes a solenoid that when energized opens the valve and when not energized closes the valve.

17. The pneumatic circuit of claim 16 wherein the relay includes a solenoid that when energized causes the valve's solenoid to de-energize.

18. The pneumatic circuit of claim 16 wherein, in response to the signal received, the controller directs the valve to close by causing the relay to de-energize the valve's solenoid if the parameter of the flow of gas in the primary circuit lies outside of a predetermined range.

19. A method for automatically stopping a flow of a gas in a primary circuit, the method comprising:
sensing a parameter of the flow of the gas in the primary circuit and generating a signal that represents the sensed parameter;
receiving the sensor's signal;
comparing the parameter represented by the received signal to a predetermined range; and
in response to the parameter lying outside of the predetermined range, closing a valve of a control circuit that includes a pilot gas, the valve having an inlet and an outlet wherein when the valve is open the pressure of the pilot gas at the valve's outlet equalizes with the pressure of the pilot gas at the valve's inlet, and when the valve is closed the pressure of the pilot gas at the valve's outlet is prevented from equalizing with the pressure of the pilot gas at the valve's inlet, wherein closing the valve of the control circuit causes:
the pressure of the pilot gas at a control input of a primary pressure-regulator of the primary circuit to change, and
the primary pressure-regulator of the primary circuit to close and stop the flow of gas in the primary circuit.

20. The method of claim 19 wherein sensing the parameter of the flow of gas in the primary circuit includes sensing the static pressure of the gas.

21. The method of claim 19 wherein the predetermined range includes a threshold static pressure existing for a period.

22. The method of claim 19 wherein:
the valve includes a solenoid that when energized closes the valve and when de-energized opens the valve; and
closing the valve of the control circuit includes passing an electric current through the solenoid to energize the solenoid.

23. The method of claim 19 wherein:
the valve includes a solenoid that when energized opens the valve and when de-energized closes the valve; and
closing the valve of the control circuit includes a relay of the control circuit stopping electric current to the valve to de-energize the valve's solenoid.

24. The method of claim 23 wherein the relay includes a solenoid; and closing the valve includes energizing the relay's solenoid.

25. The method of claim 19 wherein changing the pressure of the pilot gas in the valve's outlet includes reducing the pressure.

26. The method of claim 19 wherein changing the pressure of the pilot gas in the valve's outlet includes venting the pilot gas into the ambient environment.

27. The method of claim 19 further comprising maintaining, with a pressure regulator of the control circuit, the pressure of the pilot gas in the valve's inlet.

28. The method of claim 27 further comprising modifying the pressure of the pilot gas in the valve's inlet by adjusting the pressure regulator to maintain a different pilot-gas pressure in the valve's inlet.

* * * * *